(12) United States Patent
Sugumar

(10) Patent No.: US 11,403,101 B1
(45) Date of Patent: Aug. 2, 2022

(54) INTRODUCING NOISE IN THREADED EXECUTION TO MITIGATE CROSS-THREAD MONITORING

(71) Applicant: Marvell Asia Pte Ltd, Singapore (SG)

(72) Inventor: Rabin Sugumar, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/444,125

(22) Filed: Jul. 30, 2021

Related U.S. Application Data

(60) Provisional application No. 63/153,812, filed on Feb. 25, 2021.

(51) Int. Cl.
    *G06F 9/30*    (2018.01)
    *G06F 7/58*    (2006.01)
    *G06F 9/38*    (2018.01)
    *G06F 21/54*   (2013.01)

(52) U.S. Cl.
    CPC .......... *G06F 9/30181* (2013.01); *G06F 7/588* (2013.01); *G06F 9/3836* (2013.01); *G06F 9/3867* (2013.01); *G06F 21/54* (2013.01); *G06F 9/30101* (2013.01)

(58) Field of Classification Search
    CPC .. G06F 9/30181; G06F 9/3836; G06F 9/3867; G06F 9/30101; G06F 7/588; G06F 21/54
    See application file for complete search history.

(56) References Cited

U.S. PATENT DOCUMENTS

| 10,540,181 | B2 | 1/2020 | Mukherjee et al. | |
| 2015/0106872 | A1* | 4/2015 | Hiser | G06F 21/56 726/1 |
| 2018/0096139 | A1* | 4/2018 | Gao | G06F 21/54 |
| 2020/0201604 | A1* | 6/2020 | Felix | G06F 7/582 |
| 2022/0083347 | A1* | 3/2022 | Constable | G06F 9/4418 |

FOREIGN PATENT DOCUMENTS

WO    WO-2020255144 A1 * 12/2020

OTHER PUBLICATIONS

Braun et al.; Robust and Efficient Elimination of Cache and Timing Side Channels; 2015 (Year: 2015).*
(Continued)

*Primary Examiner* — Corey S Faherty
(74) *Attorney, Agent, or Firm* — Young Basile Hanlon & MacFarlane, P.C.

(57) ABSTRACT

Described herein are systems and methods for introducing noise in threaded execution to mitigate cross-thread monitoring. For example, some systems include an integrated circuit including a processor pipeline that is configured to execute instructions using an architectural state of a processor core; data storage circuitry configured to store a thread identifier; and a random parameter generator. The integrated circuit may be configured to: determine a time for insertion based on a random parameter generated using the random parameter generator; at the time for insertion, insert one or more instructions in the processor pipeline by participating in thread arbitration using the thread identifier; and execute the one or more instructions using one or more execution units of the processor pipeline.

20 Claims, 10 Drawing Sheets

(56) References Cited

OTHER PUBLICATIONS

Brotzman et al.; Ghost Thread: Efective User-Space Cache Side Channel Protection; 2021 (Year: 2021).*
Rane et al.; Raccoon: Closing Digital Side-Channels through Obfuscated Execution; 2015 (Year: 2015).*
Townley et al.; SMT-COP: Defeating Side-Channel Attacks on Execution Units in SMT Processors; 2019 (Year: 2019).*
Crane et al. Thwarting Cache Side-Channel Attacks Through Dynamic Software Diversity; 2015 (Year: 2015).*
Irwin et al.; Instruction Stream Mutation for Non-Deterministic Processors; 2002 (Year: 2002).*
Bayrak et al.; An Architecture-Independent Instruction Shuffler to Protect against Side-Channel Attacks; 2012 (Year: 2012).*
Demme et al., "A Quantitative, Experimental Approach to Measuring Processor Side-Channel Security", IEEE Micro, pp. 68-77, May/Jun. 2013.
Aldaya et al., "Port Contention for Fun and Profit", 2019 IEEE Symposium on Security and Privacy, pp. 870-887, Date of Conference: May 19-23, 2019, Date published online for download availability: Sep. 16, 2019.
Thomas E. Tkacik, "A Hardware Random Number Generator" CHES 2002, LNCS 2523, pp. 450-453, 2003.

* cited by examiner

INTRODUCING NOISE IN THREADED EXECUTION TO MITIGATE CROSS-THREAD MONITORING

CROSS-REFERENCE TO RELATED APPLICATION(S)

This application claims priority to and the benefit of U.S. Provisional Application Patent Ser. No. 63/153,812, filed Feb. 25, 2021, the entire disclosure of which is hereby incorporated by reference.

TECHNICAL FIELD

This disclosure relates to introducing noise in threaded execution to mitigate cross-thread monitoring.

BACKGROUND

A processor pipeline includes multiple stages through which instructions advance, a cycle at a time. In a scalar processor, instructions proceed one-by-one through the pipeline, with at most a single instruction being committed per cycle. In a superscalar processor, multiple instructions may proceed through the same pipeline stage at the same time, allowing more than one instruction to issue per cycle, depending on certain conditions (called hazards), up to an issue width. Some processors issue instructions in-order (according to a program order), with consecutive instructions proceeding through the pipeline in program order. Other processors allow instructions to be reordered and issued out-of-order, which potentially increases overall pipeline throughput. If reordering is allowed, instructions can be reordered within a sliding instruction window (whose size can be larger than the issue width), and a reorder buffer can be used to temporarily store results (and other information) associated with instructions in the instruction window to enable the instructions to be committed in-order (potentially allowing multiple instructions to be committed in the same cycle as long as they are contiguous in the program order).

Simultaneous multi-threading (SMT) is a widely employed mechanism in processor design to increase core throughput (e.g., Intel processors that are used in most personal computers and servers implement SMT). SMT is a technique where processor cores support multiple execution contexts in a core pipeline with the contexts time sharing core resources. Since in typical execution each context is stalled for many cycles periodically—for instance when waiting for a memory request to be completed—having other context allows some of the idle cycles to be used productively by the other contexts increasing the net throughput from the core. SMT with greater than two contexts has been implemented.

Since the two contexts in the core share resources intimately, a context may get an idea on what the other context is doing through carefully constructed timing attacks. Such attacks could be used to leak secrets in certain scenarios. An example of such an attack is described in "Port Contention for Fun and Profit," A. C. Aldaya et al., IEEE Symposium on Security and Privacy 2019.

SUMMARY

Disclosed herein are implementations of introducing noise in threaded execution to mitigate cross-thread monitoring.

A first aspect of the disclosed implementations is an integrated circuit, comprising: a processor pipeline that is configured to execute instructions using an architectural state of a processor core; data storage circuitry configured to store a thread identifier; and a random parameter generator; in which the integrated circuit is configured to: determine a time for insertion based on a random parameter generated using the random parameter generator; at the time for insertion, insert one or more instructions in the processor pipeline by participating in thread arbitration using the thread identifier; and execute the one or more instructions using one or more execution units of the processor pipeline.

A second aspect of the disclosed implementations is a method that includes: determining a time for insertion based on a random parameter generated using a random parameter generator; at the time for insertion, inserting one or more instructions in a processor pipeline by participating in thread arbitration using a thread identifier; and executing the one or more instructions using one or more execution units of the processor pipeline.

A third aspect of the disclosed implementations is an integrated circuit, comprising: means for executing instructions in a processor pipeline using an architectural state of a processor core; means for storing a thread identifier; and means for generating a random parameter; where executing the instructions comprises: determining a time for insertion based on the random parameter; at the time for insertion, inserting one or more instructions in the processor pipeline by participating in thread arbitration using the thread identifier; and executing the one or more instructions using one or more execution units of the processor pipeline.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Described herein are systems and methods for introducing noise in threaded execution to prevent or mitigate cross-thread monitoring. The techniques described here may block such attacks and will mitigate or eliminate a major security vulnerability of SMT designs.

Each thread that is executed in these SMT designs (also called a hardware thread (HART), or a strand) is associated with a context representing a corresponding state associated with the resources of a processor that are being shared among the threads (e.g., the processor pipeline). One or more software threads may be executing, one at a time, on a given hardware thread. Multiple hardware threads (referred to herein as simply "threads") can execute concurrently using SMT techniques. The techniques described herein apply to SMT designs with more than two contexts. However, two contexts is a common implementation of SMT. To simplify the description, the rest of this document focuses primarily on examples of two context SMT.

A processor core includes circuitry that is configured to randomly insert instructions into a processor pipeline using a thread identifier for thread arbitration. The timing of the instructions is randomized in a manner that may achieve a desired rate of noise instruction insertion. For example, the rate of noisy instruction insertion may be determined as an absolute rate in time (e.g., a frequency of insertion) or as a percentage of a combined execution rate of all threads running on the processor core. In some implementations, the target rate for noise instruction insertion is also randomized. The class of the noise instruction inserted may be randomly selected. In some implementations, a history of classes for instructions recently executed in the processor pipeline is maintained and the class of a noise instruction is chosen to match the class of a recently executed instruction. For example, a noise instruction may be inserted in a fetch stage or a dispatch stage of the processor pipeline using thread arbitration. Any of a variety of techniques are possible for arbitrating among threads. For example, techniques used for thread arbitration may include using logic circuitry that selects among signals from one or more threads (e.g., signals asserted on wires and/or written as values in storage elements) to synchronize access, and/or using schemes such as round-robin arbitration to circulate access among contending threads. In some implementations, the insertion of noise instructions may be disabled when only a single real thread is running on the processor pipeline to improve performance.

The systems and techniques described herein may provide advantages over conventional systems and techniques, such as, for example, enough noise may be injected into side-channels to reduce the side-channel vulnerability factor (SVF) of a processor core.

Figure 1:
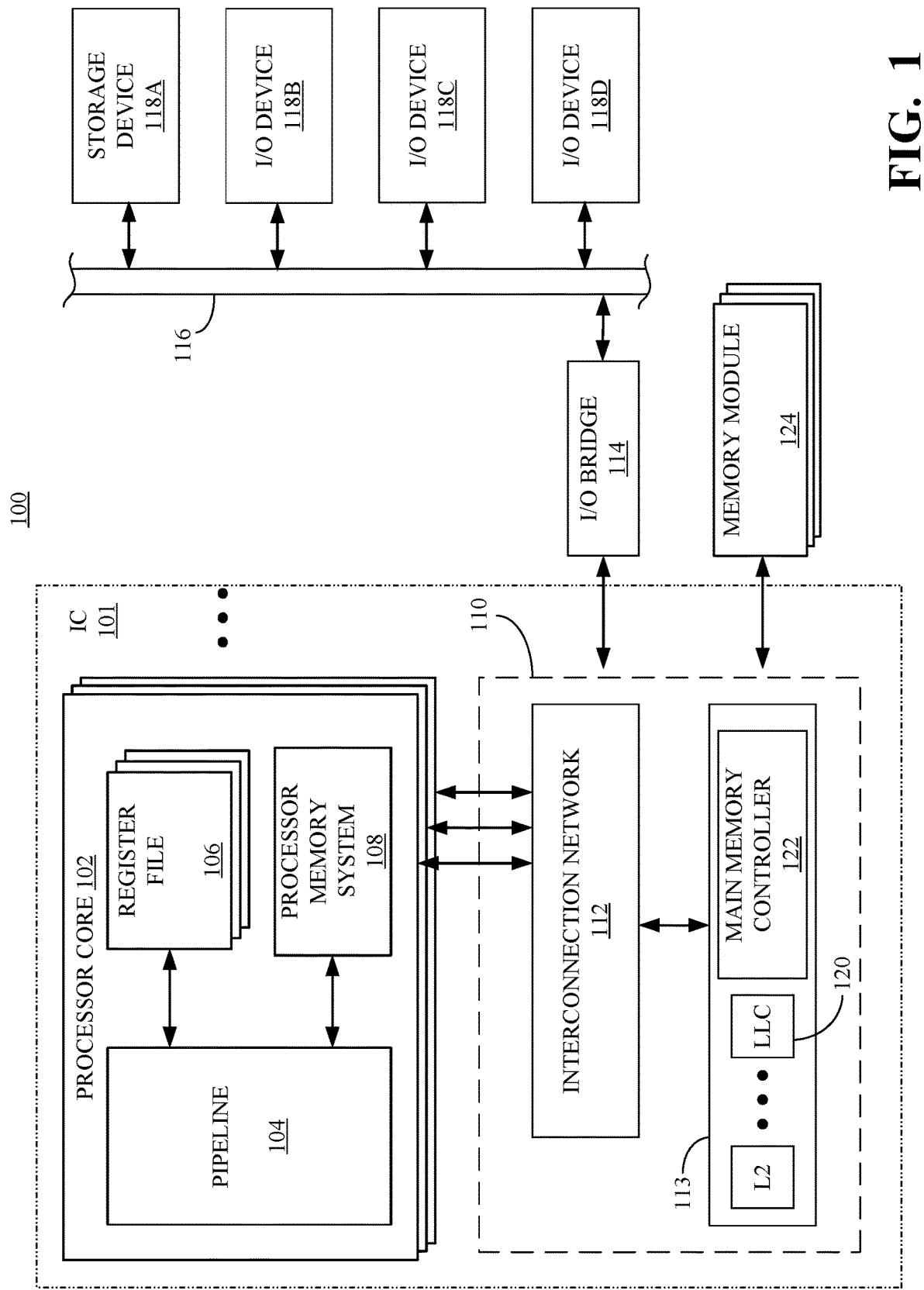
FIG. 1 is a high-level block diagram of an example of a computing system 100.
Figure 2:
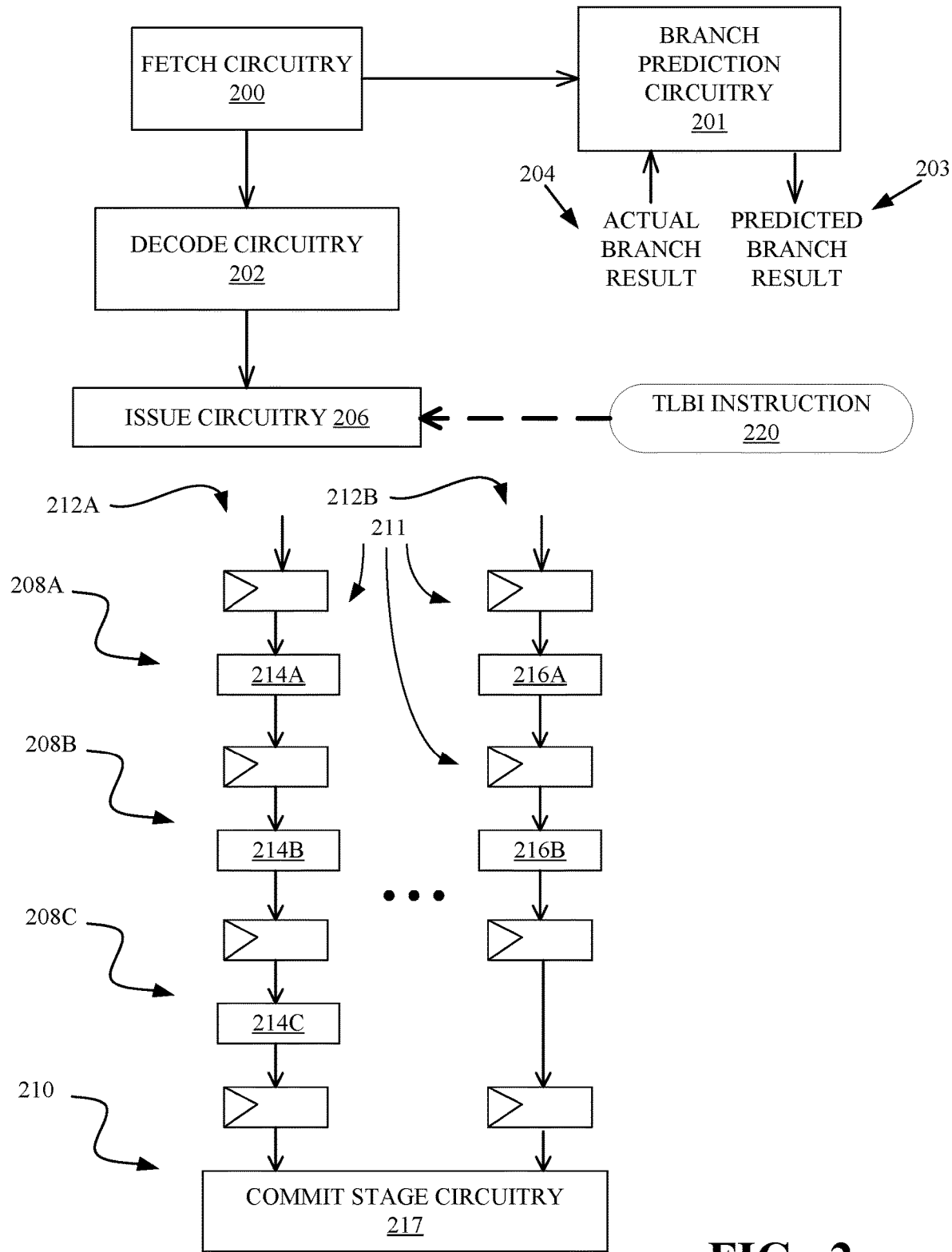
FIG. 2 is an example of a configuration of the pipeline of FIG. 1.
Figure 3:
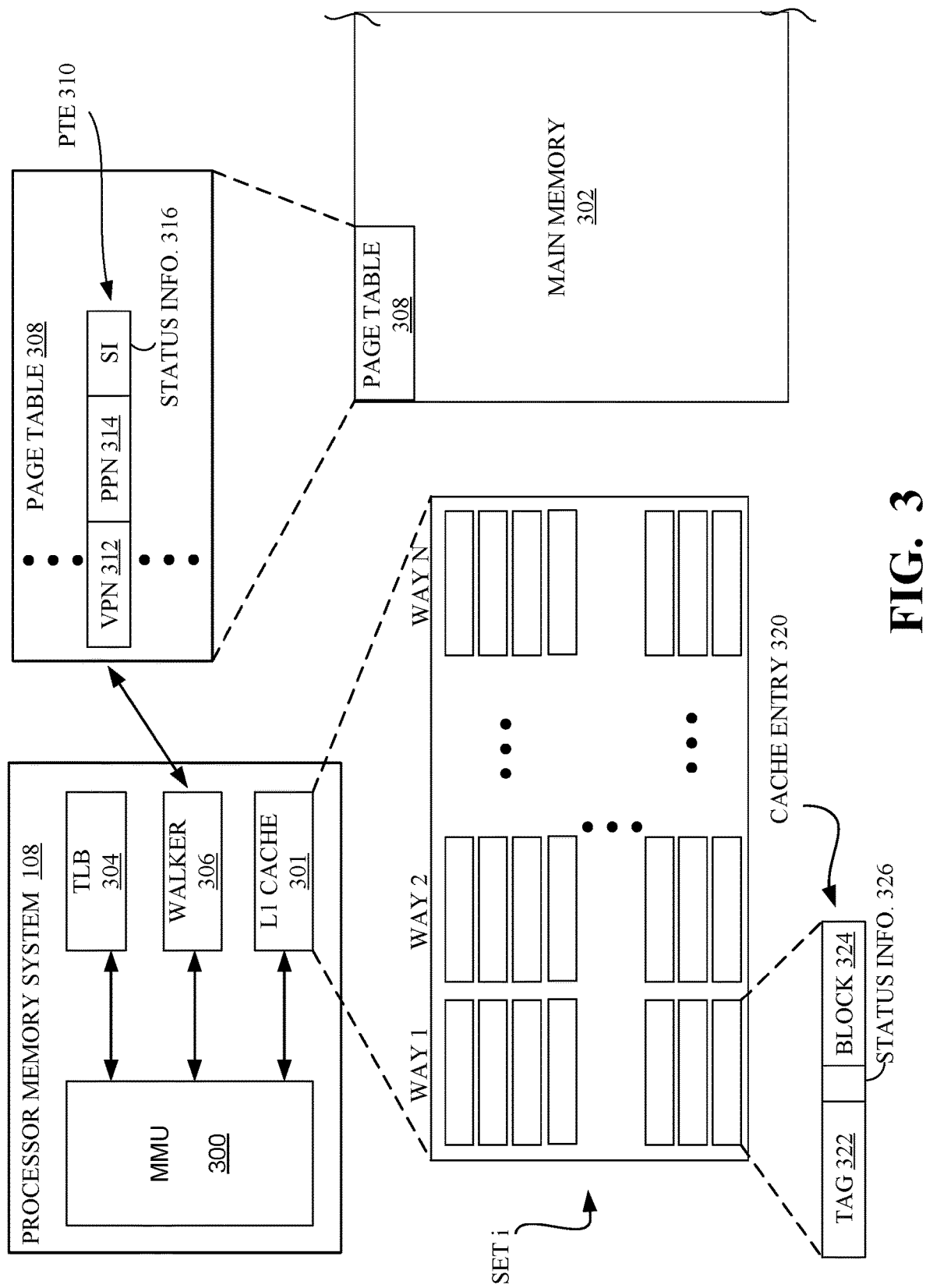
FIG. 3 is an example of a configuration of the processor memory system of FIG. 1.

Further details of techniques for introducing noise in threaded execution to mitigate cross-thread monitoring are described herein with initial reference to a system in which they can be implemented, as shown in FIGS. 1 through 3.

FIG. 1 is a high-level block diagram of an example of a computing system 100. The computing system 100 includes an integrated circuit 101 with at least one processor core 102, which can be a single central processing unit (CPU) or one of multiple processor cores in a multi-core architecture. In a multi-core architecture each processor core (or simply "core") can include an individual CPU with associated circuitry. In this example of a multi-core architecture, each processor core 102 can include a processor pipeline 104, one or more register files 106, and a processor memory system 108. Each register file of the register files 106 can include one or more individually addressable registers. For example, the register files 106 may include the architectural state 620 of FIG. 6. The integrated circuit 101 may be configured for mitigation of side-channel attacks using noisy micro-operations. For example, the integrated circuit 101 may be used to implement the technique 800 of FIG. 8. For example, the integrated circuit 101 may be used to implement the technique 900 of FIG. 9. For example, the integrated circuit 101 may be used to implement the technique 1000 of FIG. 10.

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, . . . , LN. The L1 level is a lower level memory than the L2 memory system, which in turn is a lower level than the L2 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, . . . ) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 204 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217; Instead the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 208A and 208B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

Various types of external instructions can be received from other processor cores. Such externally received instructions can be inserted into the pipeline 104 by the issue circuitry 206 to be handled at the appropriate stage. An example of such an externally received instruction is a TLB invalidation (TLBI) instruction 220 for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast TLBIs have been completed. Said another way, an originating processor core that issues a broadcast TLBI instruction can subsequently issue a data synchronization barrier (DSB) instruction, which in turn causes GlobalSync instructions to be received by every other processor core. In response to the GlobalSync instruction, when a receiving processor core completes the TLBI instruction, the receiving processor core sends, or causes to be sent, an acknowledgement to the originating process core. Once the originating process core receives acknowledgements from all receiving processor cores, the originating process core can proceed with instruction execution.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1).

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data.

For an N-way set associative cache, the tag comparison can be performed N times (possibly in parallel) for the selected "set" (i). The comparison can be performed once for each of N "ways" in which a cache block containing the desired data may be stored.

The block offset can then be used to select a particular word from a cache block that is found in the cache entry (i.e., a 'cache hit'). If the tag does not match for any of the ways of the selected set (i.e., a 'cache miss'), then the cache system can attempt to retrieve the cache block from a higher level cache or from the main memory 302 (in the case of the LLC). The cache entry 320 can also include bits for storing status information 326. The status information 326 can include, for example, a valid bit and/or any flags or error correction bits.

When establishing a translation from a particular virtual address to a particular physical address or to an intermediate physical address, various types of context information can be used to distinguish otherwise identical virtual addresses from each other. The context information can enable multiple independent virtual address spaces to exist for different processes or different virtual machines or any of a variety of other differentiating characteristics that support different virtual address spaces.

Various portions of the context information can be used for differentiating between virtual addresses that are in use within different VA-to-PA translations, or in the case that intermediate physical addresses (IPAs) are used, VA-to-IPA translations, or IPA-to-PA translations.

For example, an operating system can use an address space identifier (ASID) (e.g., 16 bits) to identify a memory space (a virtual address space) associated with a running process. A hypervisor can use a virtual machine identifier (VMID) (e.g., 16 bits) to identify a memory space (i.e., an intermediate physical address space) associated with a guest operating system of a virtual machine.

Certain parameters can be associated with different classes of processes or software environments that are available in an architecture, such as a security state with values of secure (S) or non-secure (NS), or an exception level (also called a 'priority level') with values of EL0-EL3 (for a 2-bit exception level), for example.

All or a subset of this context information together constitute a context (also called a "translation context" or a "software context") for a particular virtual address.

A context identifier (CID) can represent either the full context information or partial context information. In some architectures, for example, the full context information can include 35 bits: a 2-bit exception level (EL), a 1-bit non-secure/secure (NS/S) value, a 16-bit VMID, and a 16-bit ASID.

It is to be noted, though, that there can potentially be significant overhead in terms of integrated circuit area devoted to the storage for the data structure that tracks validity for different CIDs. To reduce the overhead, the CID can include partial context information, such as only the 16-bit VMID and the 2-bit EL. Such partial context information can uniquely identify different subsets of contexts. Alternatively, instead of simply concatenating subsets of bits from the full context information, techniques can be used to essentially compress full context information into fewer bits. For example, circuitry that computes the CIDs can be configured to include fewer bits than the full context information, where those bits can be assigned based on a stored mapping between CIDs and a corresponding full context information string.

While the mapping itself takes space on the integrated circuit, more space can be saved in the data structure that tracks validity of different active CIDs. Additional details about techniques for compressing context information can be found, for example, in U.S. Pat. No. 9,779,028, entitled "MANAGING TRANSLATION INVALIDATION," which is incorporated herein by reference.

Figure 4:
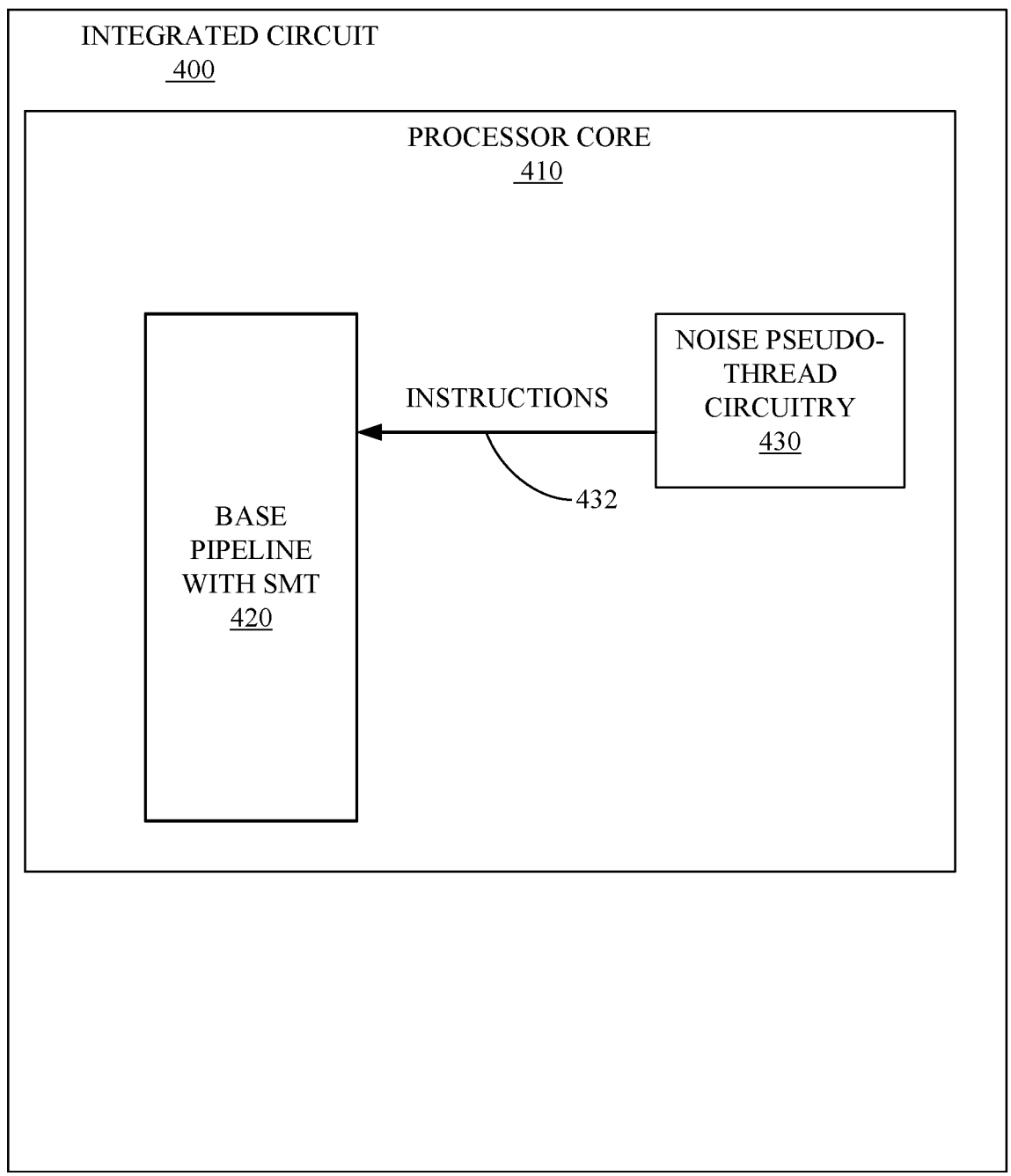
FIG. 4 is a block diagram of an example of an integrated circuit for introducing noise in threaded execution to mitigate cross-thread monitoring.

FIG. 4 is a block diagram of an example of an integrated circuit 400 for introducing noise in threaded execution to mitigate cross-thread monitoring. The integrated circuit 400 includes a processor core 410 including a base pipeline with SMT 420 and a noise pseudo-thread circuitry 430. The noise pseudo-thread circuitry 430 is configured to randomly insert instructions 432 for execution in the base pipeline with SMT 420, which may simulate the presence of an additional noisy sharing the resources of the processor core 410 with the software threads being executed using the base pipeline with SMT 420. The noise pseudo-thread circuitry 430 may be added to introduce interference that makes it difficult for an attacker thread to gather information (e.g., side-channel information) about a victim thread that is also being executed using the base pipeline with SMT 420. This noise pseudo-thread circuitry 430 does not execute software and can be considered a dummy thread introduced to create interference. The instructions 432 generated by the noise pseudo-thread circuitry 430 are collectively called a "noise pseudo-thread" in this document. In some implementations, the noise pseudo-thread circuitry 430, randomly and at a certain average rate that is configurable, introduces instructions 432 that also execute on the base pipeline with SMT 420. These random instructions will interfere with timing measurements by an attacker thread. When the rate of instructions from the noise thread is sufficiently high there will be too much random variation in the measurements of the attacker and the attack will not succeed. The threads that are running software are called "real threads" in this description. Note that when an attack is in progress one of the real threads is running victim code and the other real thread is running attacker code. For example, the noise pseudo-thread circuitry 430 may be the noise pseudo-thread circuitry 500 of FIG. 5. For example, the integrated circuit 400 may be used to implement the technique 800 of FIG. 8. For example, the integrated circuit 400 may be used to implement the technique 900 of FIG. 9. For example, the integrated circuit 400 may be used to implement the technique 1000 of FIG. 10.

Here are additional details regarding examples of how a noise pseudo-thread may be designed to be most effective. The noise pseudo-thread may have a dedicated small architectural register space e.g., four general purpose registers and four floating point registers to serve as arguments for executing instructions. To create interference without significant performance or power impact, an average instruction rate of the noise pseudo-thread may be set to be a percentage of the combined rate of execution of the real threads. An average noise pseudo-thread execution rate that is a few percent of the combined real execution rate may be sufficient to stop most attacks. The lower the noise pseudo-thread execution rate the lower the performance impact. It is expected that noise pseudo-thread execution rate defined as a percentage of combined real execution rate will be configurable, allowing system administrators to tune the rate up and down to get the best protection at the lowest performance and power impact. In some implementations, the noise pseudo-thread may be disabled when only a single thread is active.

There are well known techniques to create randomness in hardware. A random engine is implemented as part of the noise pseudo-thread circuitry 430. The configured rate at which instructions need to be generated may be provided to the random engine. The random engine may send out a signal whenever it determines that the noise pseudo-thread needs to insert an instruction. It may help confuse attackers further if the random rate is randomized further, where over time granules (e.g., thousands of cycles), the random rate itself varies randomly in a range. For example, an additional random engine may be implemented to randomly vary the rate. It may be advantageous for the instructions inserted by the noise pseudo-thread to be similar to instructions executed by the real threads, which may increase attack interference. In some implementations, the noise thread may maintain a table of the classes of the last N instructions executed by the real threads, and whenever a new noise pseudo-thread instruction is needed it picks an instruction class randomly from the last N instructions table and issues it into the base pipeline with SMT 420. An additional random engine may be implemented to choose the random class. For example, N may be of the order of tens of instructions. The categorization of instructions into classes is somewhat architecture dependent. In addition, to classes based on an instruction set architecture, such as ADD, SHIFT, LOAD, STORE, FP ADD, FP FMA, and other such, there could be additional classes such as LOAD THAT MISSED DCACHE and LOAD THAT REQUIRED A TABLEWALK. For these latter kinds of classes the instruction may carry this information to the backend of the pipeline, and the backend of the pipeline may automatically treat the instruction as a cache miss or a tablewalk without checking the addresses. It will be a fake action solely to create interference. For example, a tablewalk may include traversing one or more tables of address information to translate a virtual address into a physical address. For example, the noise pseudo-thread may be considered a dummy thread and, in some implementations, there is no architectural state associated with the noise pseudo-thread.

Instructions from the noise pseudo-thread may be inserted at different points of the base pipeline with SMT 420. For example, the insertion may be at a fetch stage, a dispatch stage, or an issue stage. In some implementations, instructions are converted into micro-operations early in the pipeline. In such implementations it may be advantageous to insert instructions as micro-operations into the pipeline instead of as macro-operations expressed in a format specified by an instruction set architecture. Some implementations may fetch or dispatch multiple instructions (e.g., macro-operations or micro-operations) per cycle. In such implementations, it may be advantageous to insert noise pseudo-thread instructions as a bundle of multiple instructions where the number of instructions in the bundle is also randomized.

Figure 5:
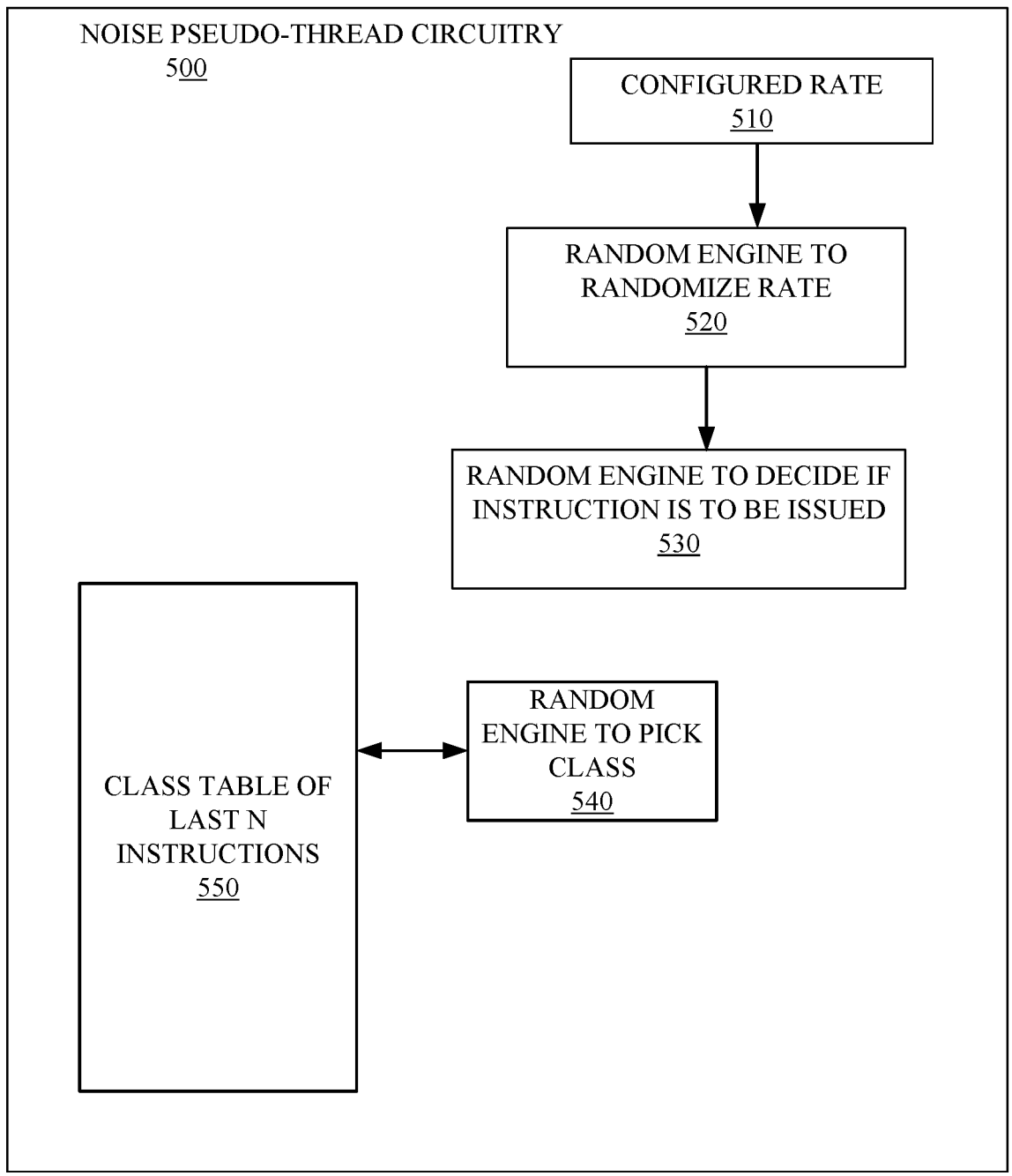
FIG. 5 is a block diagram of an example of circuitry implementing a noise pseudo-thread that inserts instructions in a pipeline for execution using thread arbitration.

FIG. 5 is a block diagram of an example of circuitry 500 implementing a noise pseudo-thread that inserts instructions in a pipeline for execution using thread arbitration. The noise pseudo-thread circuitry 500 includes a configured rate 510; a random engine 520 to randomize the rate of instruction insertion; a random engine 530 to decide if/when an instruction is to be issued based on the rate instruction insertion; a random engine 540 to pick the class of instruction to be inserted next; and a class table 550 storing indications of instruction class for the last N instructions executed by a pipeline. For example, the noise pseudo-thread circuitry 500 may be used to implement the technique 800 of FIG. 8. For example, the noise pseudo-thread circuitry 500 may be used to implement the technique 900 of FIG. 9. For example, the noise pseudo-thread circuitry 500 may be used to implement the technique 1000 of FIG. 10.

The noise pseudo-thread circuitry 500 stores a configured rate 510 (e.g., stored in a register or other data storage circuitry) that may be used to determine how often instructions will be inserted in a processor pipeline by the noise pseudo-thread circuitry 500. For example, the configured rate 510 may indicate a desired frequency of instruction insertion to be achieved over a window of time. For example, the configured rate 510 may indicate a desired percentage of a combined execution rate of all threads running on the processor core to be occupied by instructions inserted by the noise pseudo-thread circuitry 500 over a window of time.

The noise pseudo-thread circuitry 500 includes a random engine 520 to randomize the rate of instruction insertion. For example, the random engine 520 may include a random number generator (e.g., a true random number generator or pseudorandom number generator) and coupled logic to randomly set a parameter that is used to control an average rate at which instructions are inserted in a processor pipeline by the noise pseudo-thread circuitry 500 using its thread identifier. In some implementations, the randomly set parameter is based on the configured rate 510 (e.g., as random deviation from the configured rate 510).

The noise pseudo-thread circuitry 500 includes a random engine 530 to decide if/when an instruction is to be issued based on the rate instruction insertion. For example, the random engine 530 may include a random number generator (e.g., a true random number generator or pseudorandom number generator) and coupled logic to randomly decide whether an instruction will be inserted in a processor pipeline at a particular clock cycle.

The noise pseudo-thread circuitry 500 includes a random engine 540 to pick the class of instruction to be inserted next. For example, the random engine 530 may include a random number generator (e.g., a true random number generator or pseudorandom number generator) and coupled logic to randomly pick the class for a next instruction for insertion from a set of available classes of instructions. For example, the random engine 530 may select a class from the set of classes indicated by entries of the class table 550. In some implementations (not shown in FIG. 5), the random engine 540 to pick the class for the next instruction randomly from a set of classes independently from instructions that have been previously executed.

The noise pseudo-thread circuitry 500 includes a class table 550 storing (e.g., stored in a buffer or other data storage circuitry) indications of instruction class for the last N instructions (e.g., the last 10 or 20 instructions) executed by a pipeline. For example, the class table 550 may store class indications for instructions executed by real threads running on the processor pipeline. For example, the class table 550 may store class indications for all instructions executed on the processor pipeline.

Figure 6:
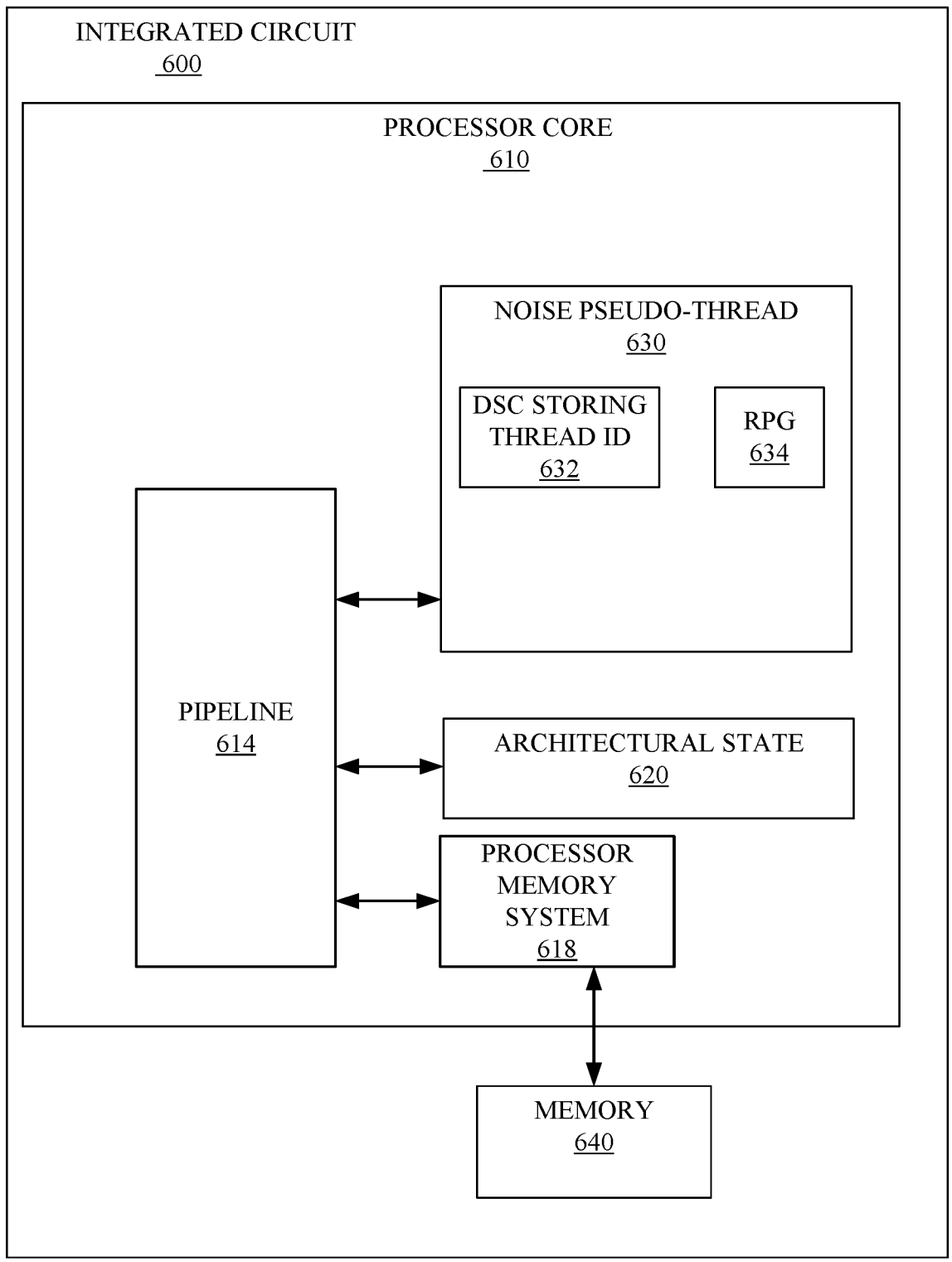
FIG. 6 is a block diagram of an example of an integrated circuit for introducing noise in threaded execution to mitigate cross-thread monitoring.

FIG. 6 is a block diagram of an example of an integrated circuit 600 for introducing noise in threaded execution to mitigate cross-thread monitoring. The integrated circuit 600 includes a processor core 610 including a processor pipeline 614, a processor memory system 618, an architectural state 620, and a noise pseudo-thread circuitry 630. The integrated circuit 600 includes a memory 640 configured to store instructions and data. The noise pseudo-thread circuitry 630 includes a data storage circuitry 632 configured to store a thread identifier and a random parameter generator 634. The integrated circuit 600 may be configured to determine a time for insertion based on a random parameter generated using the random parameter generator 634; at the time for insertion, insert one or more instructions in the processor pipeline 614 by participating in thread arbitration using the thread identifier; and execute the one or more instructions using one or more execution units of the processor pipeline 614, which may introduce noise in side-channels of the processor core 610 to mitigate side-channel attacks on real threads running on the processor core 610. For example, the integrated circuit 600 may be used to implement the technique 800 of FIG. 8. For example, the integrated circuit 600 may be used to implement the technique 900 of FIG. 9. For example, the integrated circuit 600 may be used to implement the technique 1000 of FIG. 10.

The integrated circuit 600 includes a processor core 610 including a processor pipeline 614 that is configured to execute instructions using an architectural state 620 of the processor core 610. For example, the processor pipeline 614 may be the processor pipeline 104 of FIG. 2. For example, the processor pipeline 614 may be configured to execute instructions of an instruction set architecture, such as an Advanced RISC Machine (ARM) instruction set architecture or an x86 instruction set architecture. The processor core 610 stores the architectural state 620 associated with its instruction set architecture. For example, the architectural state 620 may include a set of registers that are accessible by software in accordance with an instruction set architecture. The processor core 610 includes a noise pseudo-thread circuitry 630, which may be configured to insert noise instructions in the processor pipeline 614 to enhance security of real threads executing instructions in the processor pipeline 614.

The integrated circuit 600 includes a memory 640 (e.g., a random access memory (RAM)) configured to store instructions. The memory 640 may also be configured to store other data. The memory 640 may include many data storage circuitries that can be accessed using an addressing scheme. The processor core 610 may access instructions and other data stored in the memory 640 using its processor memory system 618. In some implementations, the processor memory system 618 includes an L1 instruction cache of the processor core 610. For example, the processor memory system 618 may be the processor memory system 108 of FIG. 3. In this example, the memory 640 is included in the integrated circuit 600, but in some implementations, the instructions may be stored in a memory external to the integrated circuit 600.

The integrated circuit 600 includes the noise pseudo-thread circuitry 630, which includes a data storage circuitry 632 (e.g., a register) configured to store a thread identifier. The noise pseudo-thread circuitry 630 also includes a random parameter generator 634. For example, the random parameter generator 634 may be a true random number generator (TRNG). For example, the random parameter generator 634 may be a pseudo-random number generator. For example, the random parameter generator 634 may be used to generate a random number based on thermal noise. In some implementations, the random parameter generator 634 includes a linear feedback shift register (LFSR) and a cellular automata shift register (CASR) that are driven by respective oscillators. For example, the random parameter generator 634 may include a random number generator described by Thomas Tkacik in "A Hardware Random Number Generator." See Tkacik T. E. (2003) "A Hardware Random Number Generator." In: Kaliski B. S., Koç. K., Paar C. (eds) Cryptographic Hardware and Embedded Systems—CHES 2002. CHES 2002. Lecture Notes in Computer Science, vol 2523. Springer, Berlin, Heidelberg. https://doi.org/10.1007/3-540-36400-5_32, which is incorporated herein by reference. In some implementations, the random parameter can be a number or other random value that is generated using any of these or other techniques, or in some implementations, the random parameter can be a timing signal that is generated at random times using any of these or other techniques.

For example, the integrated circuit 600 may be configured to determine a time for insertion based on a random parameter generated using the random parameter generator 634; at the time for insertion, insert one or more instructions in the processor pipeline 614 by participating in thread arbitration using the thread identifier; and execute the one or more instructions using one or more execution units of the processor pipeline 614. In some implementations, the random parameter generator 634 and coupled logic circuitry are configured to cause insertion of instructions using the thread identifier at an average rate determined as a percentage of a combined execution rate of all threads running on the processor core 610. For example, the one or more instructions may be inserted at a fetch stage of the processor pipeline 614. For example, the one or more instructions may be inserted at a dispatch stage of the processor pipeline 614. For example, the one or more instructions may be one or more macro-operations of an instruction set architecture supported by the processor core 610. For example, the one or more instructions may be one or more micro-operations of the processor pipeline 614. In some implementations, the integrated circuit 600 is configured to randomly select a number of instructions to be inserted as the one or more instructions. In some implementations, the integrated circuit 600 is configured to disable insertion of instructions in the processor pipeline 614 using the thread identifier when only a single thread is running on the on the processor core. For example, one of the one or more instructions may be configured to cause a cache miss or a tablewalk without checking an address.

Figure 7:
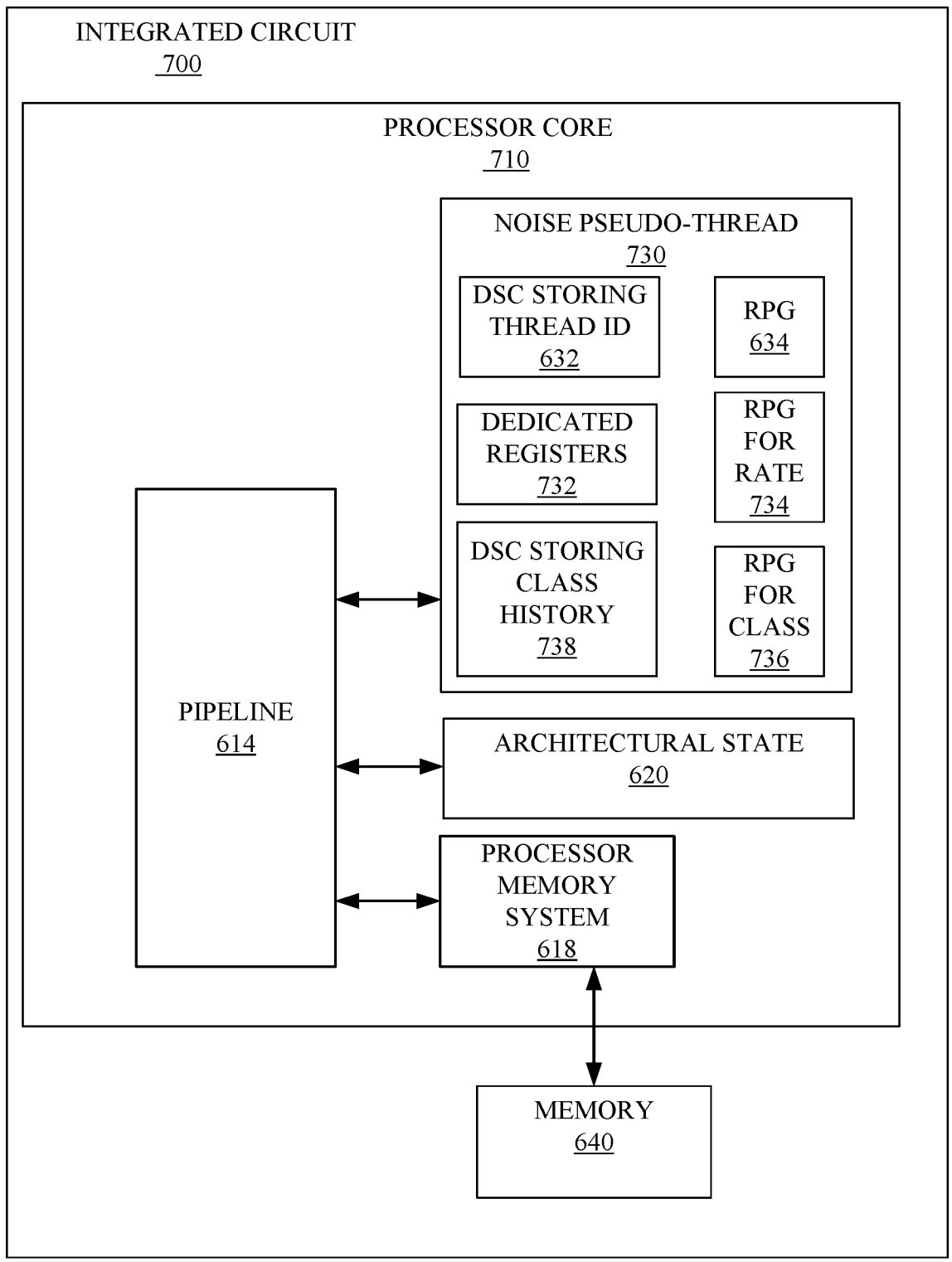
FIG. 7 is a block diagram of an example of an integrated circuit for introducing noise in threaded execution to mitigate cross-thread monitoring.

FIG. 7 is a block diagram of an example of an integrated circuit 700 for introducing noise in threaded execution to mitigate cross-thread monitoring. The integrated circuit 700 includes a processor core 710 including the processor pipeline 614, the processor memory system 618, the architectural state 620, and a noise pseudo-thread circuitry 730. The integrated circuit 700 includes the memory 640 configured to store instructions and data. The noise pseudo-thread circuitry 730 includes the data storage circuitry 632 configured to store a thread identifier, the random parameter generator 634, a set of dedicated registers 732 that are configured to be used as arguments for instructions inserted using the thread identifier, a random parameter generator 734 and coupled logic circuitry configured to randomly set a parameter that is used to control an average rate at which instructions are inserted in the processor pipeline 614 using the thread identifier, a random parameter generator 736 and coupled logic circuitry configured to randomly select a class of one of the one or more instructions, and a data storage circuitry 738 configured to store a table of classes for the last N instructions executed by threads running on the processor core 710. The integrated circuit 700 may be configured to determine a time for insertion based on a random parameter generated using the random parameter generator 634; at the time for insertion, insert one or more instructions in the processor pipeline 614 by participating in thread arbitration using the thread identifier; and execute the one or more instructions using one or more execution units of the processor pipeline 614, which may introduce noise in side-channels of the processor core 710 to mitigate side-channel attacks on real threads running on the processor core 710. For example, the integrated circuit 700 may be used to implement the technique 800 of FIG. 8. For example, the integrated circuit 700 may be used to implement the technique 900 of FIG. 9. For example, the integrated circuit 700 may be used to implement the technique 1000 of FIG. 10.

The integrated circuit 700 includes a set of dedicated registers 732 that are configured to be used as arguments for instructions inserted using the thread identifier. The set of dedicated registers 732 may be configured to be inaccessible to instructions of threads running on the processor core 710.

For example, the random parameter generator 634 and coupled logic circuitry may be configured to cause insertion of instructions using the thread identifier at a set average rate. In some implementations, the random parameter generator 634 and coupled logic circuitry are configured to cause insertion of instructions using the thread identifier at an average rate determined as a percentage of a combined execution rate of all threads running on the processor core 710.

The integrated circuit 700 includes a random parameter generator 734 and coupled logic circuitry configured to randomly set a parameter that is used to control an average rate at which instructions are inserted in the processor pipeline 614 using the thread identifier.

The integrated circuit 700 includes a random parameter generator 736 and coupled logic circuitry configured to randomly select a class of one of the one or more instructions. The integrated circuit 700 includes a data storage circuitry 738 configured to store a table of classes for the last N instructions executed by threads running on the processor core. A class of one of the one or more instructions may be selected based on the table of classes. For example, a random index to the table of classes stored in the data storage circuitry 738 may be generated by the random parameter generator 736 to select a class of one of the one or more instructions for insertion in the processor pipeline 614.

Figure 8:
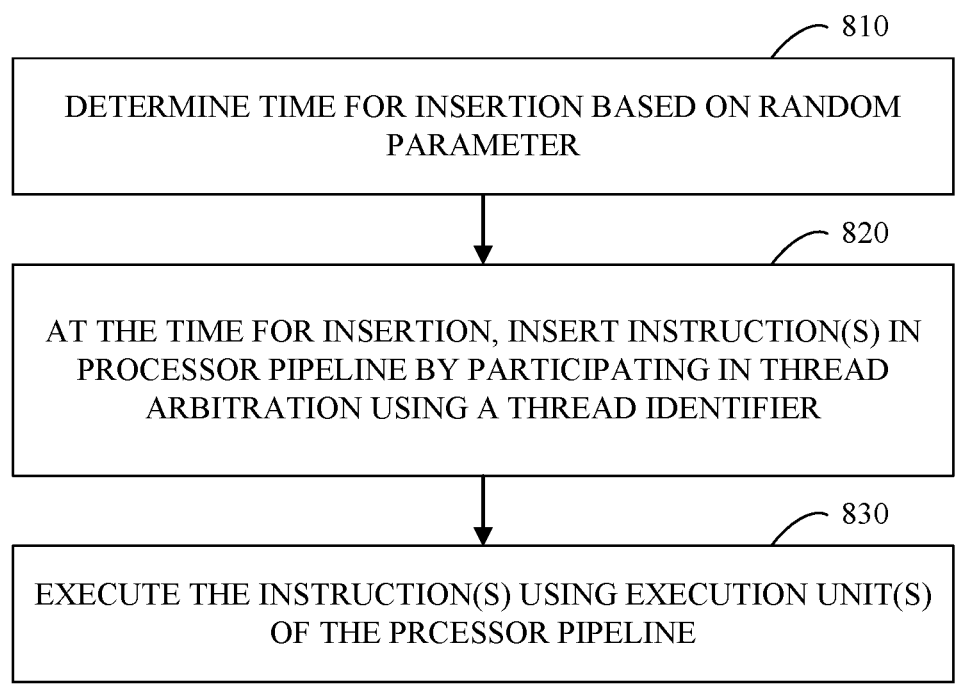
FIG. 8 is a flow chart of an example of a technique for introducing noise in threaded execution to mitigate cross-thread monitoring.

FIG. 8 is a flow chart of an example of a technique 800 for introducing noise in threaded execution to mitigate cross-thread monitoring. The technique 800 includes determining 810 a time for insertion based on a random parameter generated using a random parameter generator; at the time for insertion, inserting 820 one or more instructions in a processor pipeline by participating in thread arbitration using a thread identifier; and executing 830 the one or more instructions using one or more execution units of the processor pipeline. For example, the technique 800 may be implemented using the integrated circuit 101 of FIG. 1. For example, the technique 800 may be implemented using the integrated circuit 400 of FIG. 4. For example, the technique 800 may be implemented using the integrated circuit 600 of FIG. 6. For example, the technique 800 may be implemented using the integrated circuit 700 of FIG. 7.

The technique 800 includes determining 810 a time for insertion based on a random parameter generated using a random parameter generator. For example, the random parameter may be determined periodically and a decision of whether or not to insert one or more instructions at a given time may be made randomly based on a value of the random parameter. In some implementations, the statistics of a distribution from which the random parameter is drawn are set to cause instructions to be inserted at an expected average rate over time. For example, the random parameter may be a binary variable that is zero when no instruction will be inserted and one when an instruction will be inserted, and the distribution of the random parameter may set so the expected value of the random parameter corresponds to a desired average rate instruction insertion divided by the frequency at which the random parameter is sampled to determine 810 times for inserting instruction. In some implementations, a parameter used to map the value of the random parameter to a decision may be set to cause instructions to be inserted at an expected average rate over time. For example, the random parameter may an integer uniformly distributed over a range (e.g., uniformly distributed between 0 and 255), and a threshold may be set within this range to decide whether to insert a noise instruction based on a sample of the random parameter. In some implementations, the random parameter specifies a number of clock cycles until the next insertion of a noise instruction and the time for insertion is determined 810 based on this random delay. In some implementations, the random parameter is used to cause insertion of instructions at rate determined as a percentage of a combined rate of execution of all threads running on a processor core. For example, determining 810 a time for insertion may include implementing the technique 900 of FIG. 9.

The technique 800 includes at the time for insertion, inserting 820 one or more instructions in a processor pipeline (e.g., the processor pipeline 614) by participating in thread arbitration using a thread identifier. For example, the thread identifier may be stored in a data storage circuitry (e.g., a register) of a noise pseudo-thread circuitry (e.g., the noise pseudo-thread circuitry 630 or the noise pseudo-thread circuitry 730). In some implementations, the one or more instructions are inserted at a dispatch stage of the processor pipeline. In some implementations, the one or more instructions are inserted at a fetch stage of the processor pipeline. Using thread arbitration to insert the one or more instructions may serve to simulate a noisy thread running on the processor pipeline. In some implementations, the one or more instructions may be randomly selected. For example, the technique 1000 of FIG. 10 may be implemented to select the one or more instructions for insertion at the time for insertion.

The technique 800 includes executing 830 the one or more instructions using one or more execution units of the processor pipeline. The one or more instructions to be inserted may be selected to create noise in side-channels of the microarchitecture of the processor core that includes the processor pipeline. For example, one of the one or more instructions is configured to cause a cache miss or a table-walk without checking an address.

Figure 9:
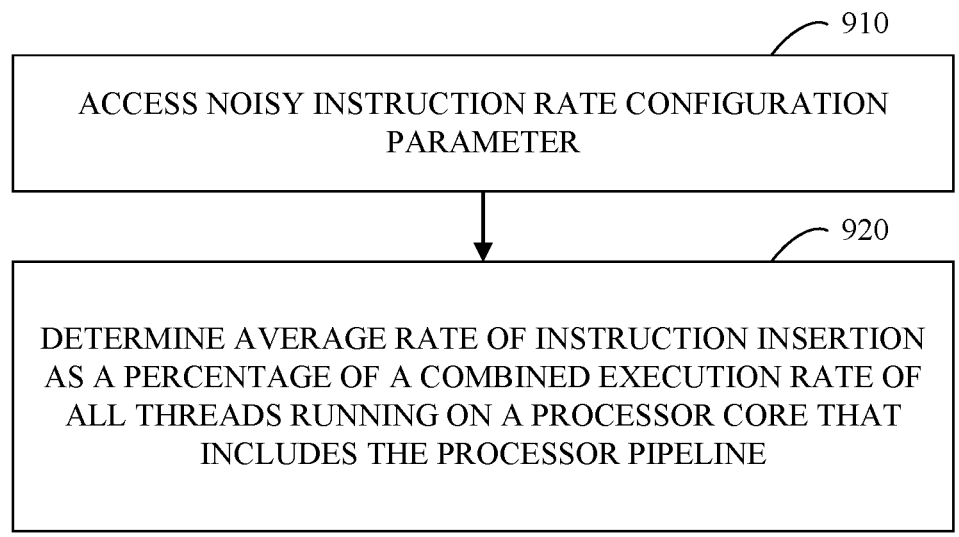
FIG. 9 is a flow chart of an example of a technique for determining a rate of instruction insertion that may be used to randomly determine timing of instruction insertion.

FIG. 9 is a flow chart of an example of a technique 900 for determining a rate of instruction insertion that may be used to randomly determine timing of instruction insertion. The technique 900 includes accessing 910 a noisy instruction rate configuration parameter; and determining 920 an average rate of instruction insertion as a percentage of a combined execution rate of all threads running on a processor core that includes the processor pipeline. For example, the technique 900 may be implemented using the integrated circuit 101 of FIG. 1. For example, the technique 900 may be implemented using the integrated circuit 400 of FIG. 4. For example, the technique 900 may be implemented using the integrated circuit 600 of FIG. 6. For example, the technique 900 may be implemented using the integrated circuit 700 of FIG. 7.

The technique 900 includes accessing 910 a noisy instruction rate configuration parameter. For example, the rate configuration parameter may be stored in a register or other data storage circuitry. For example, the rate configuration parameter may indicate a desired percentage of a combined execution rate of all threads running on the processor core to be occupied by noise instructions inserted over a window of time.

The technique 900 includes determining 920 an average rate of instruction insertion as a percentage of a combined execution rate of all threads running on a processor core that includes the processor pipeline. For example, the rate at which instructions of real threads are issued or retired by the processor pipeline in the recent past may be monitored by counting instructions with periodic clearing of the counter. In some implementations, the average rate of instruction insertion is determined by multiplying an estimate of the rate of instruction execution (e.g., based on an instruction retirement count) by a percentage that has been determined based on the configuration parameter. In some implementations, the percentage used to determine 920 the average rate of instruction insertion may be randomly set (e.g., using the random parameter generator 734). For example, the percentage may be determined with a random offset from a nominal percentage that is encoded in the rate configuration parameter.

Figure 10:
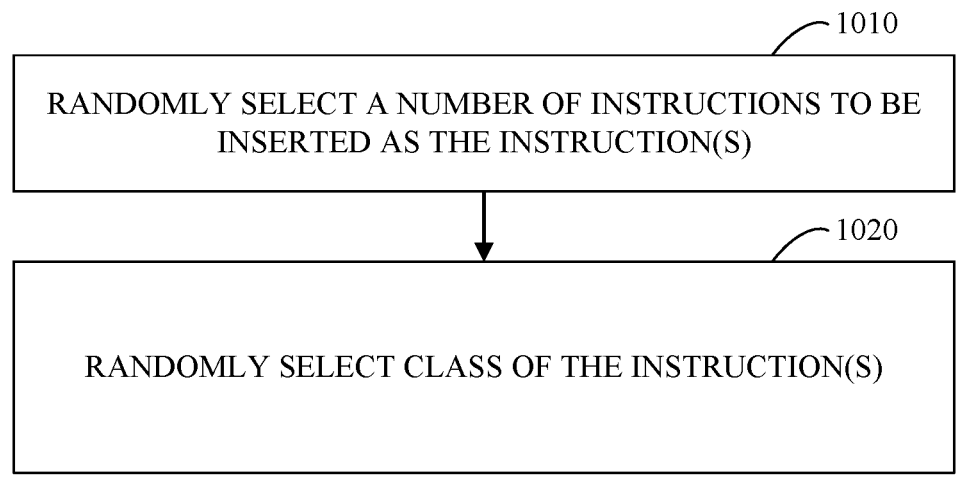
FIG. 10 is a flow chart of an example of a technique for randomly selecting instructions for insertion.

FIG. 10 is a flow chart of an example of a technique 1000 for randomly selecting instructions for insertion. The technique 1000 includes randomly selecting 1010 a number of instructions inserted in the processor pipeline using the thread identifier; and randomly selecting 1020 a class of one of the one or more instructions. For example, the technique 1000 may be implemented using the integrated circuit 101 of FIG. 1. For example, the technique 1000 may be implemented using the integrated circuit 400 of FIG. 4. For example, the technique 1000 may be implemented using the integrated circuit 600 of FIG. 6. For example, the technique 1000 may be implemented using the integrated circuit 700 of FIG. 7.

The technique 1000 includes randomly selecting 1010 a number of instructions inserted in the processor pipeline using the thread identifier. It may be advantageous to insert sequences of consecutive noise instructions in bursts to achieve a desired pattern of noise in side-channels of the microarchitecture. Random variation may be introduced in the length of these bursts of noise instructions that are inserted. For example, the number of instructions inserted consecutively starting at a determined 810 time for insertion may be random number drawn from a desired range (e.g., from 1 to 9 instructions). In some implementations, the expected value of the number of instructions in a burst may be considered when determining 810 the times for insertion of instructions. For example, a desired rate of instruction insertion may be divided by the expected number of instructions per burst when determining 810 a time for insertion.

The technique 1000 includes randomly selecting 1020 a class of one of the one or more instructions. For example, the class for a noise instruction for insertion may be selected 1020 randomly from a set of available instructions classes (e.g., ADD, SHIFT, LOAD, STORE, FP ADD, FP FMA, LOAD THAT MISSED DCACHE and LOAD THAT REQUIRED A TABLEWALK). In some implementations, a history of classes of instructions executed by real threads using the processor pipeline may be maintained and used to randomly select the class for an instruction to be inserted in a more targeted manner that is more likely to provide noise in side-channels that protects the threads currently running in the processor pipeline. For example, the class table 550 of FIG. 5 may be maintained in a data storage circuitry (e.g., the data storage circuitry 738). For example, a random index to the class table 550 may be generated to randomly select 1020 the class for a noise instruction to be inserted to match the class of an instruction that was recently executed using the processor pipeline.

For simplicity of explanation, the techniques 800, 900, and 1000 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the integrated circuit 101 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An integrated circuit, comprising:
a processor pipeline that is configured to execute instructions using an architectural state of a processor core;
data storage circuitry configured to store a thread identifier; and
a random parameter generator;
in which the integrated circuit is configured to:
determine a time for insertion based on a random parameter generated using the random parameter generator;
at the time for insertion, insert one or more instructions in the processor pipeline by participating in thread arbitration using the thread identifier; and
execute the one or more instructions using one or more execution units of the processor pipeline.

2. The integrated circuit of claim 1, comprising:
a set of dedicated registers that are configured to be used as arguments for instructions inserted using the thread identifier, and configured to be inaccessible to instructions of threads running on the processor core.

3. The integrated circuit of claim 1, in which the random parameter generator and coupled logic circuitry are configured to cause insertion of instructions using the thread identifier at a set average rate.

4. The integrated circuit of claim 1, in which the random parameter generator and coupled logic circuitry are configured to cause insertion of instructions using the thread identifier at an average rate determined as a percentage of a combined execution rate of all threads running on the processor core.

5. The integrated circuit of claim 1, in which the random parameter generator is a first random parameter generator, and further comprising:
  a second random parameter generator and coupled logic circuitry configured to randomly set a parameter that is used to control an average rate at which instructions are inserted in the processor pipeline using the thread identifier.

6. The integrated circuit of claim 1, in which the random parameter generator is a first random parameter generator, and further comprising:
  a second random parameter generator and coupled logic circuitry configured to randomly select a class of one of the one or more instructions.

7. The integrated circuit of claim 1, comprising:
  data storage circuitry configured to store a table of classes for the last N instructions executed by threads running on the processor core, wherein a class of one of the one or more instructions is selected based on the table of classes.

8. The integrated circuit of claim 1, in which the one or more instructions are inserted at a fetch stage of the processor pipeline.

9. The integrated circuit of claim 1, in which the one or more instructions are inserted at a dispatch stage of the processor pipeline.

10. The integrated circuit of claim 1, in which the one or more instructions are one or more macro-operations of an instruction set architecture supported by the processor core.

11. The integrated circuit of claim 1, in which the one or more instructions are one or more micro-operations of the processor pipeline.

12. The integrated circuit of claim 1, in which the integrated circuit is configured to:
  randomly select a number of instructions to be inserted as the one or more instructions.

13. The integrated circuit of claim 1, in which the integrated circuit is configured to:
  disable insertion of instructions in the processor pipeline using the thread identifier when only a single thread is running on the on the processor core.

14. The integrated circuit of claim 1, in which one of the one or more instructions is configured to cause a cache miss or a tablewalk without checking an address.

15. A method comprising:
  determining a time for insertion based on a random parameter generated using a random parameter generator;
  at the time for insertion, inserting one or more instructions in a processor pipeline by participating in thread arbitration using a thread identifier; and
  executing the one or more instructions using one or more execution units of the processor pipeline.

16. The method of claim 15, comprising:
  determining an average rate of instruction insertion as a percentage of a combined execution rate of all threads running on a processor core that includes the processor pipeline.

17. The method of claim 15, comprising:
  randomly selecting a class of one of the one or more instructions.

18. The method of claim 15, in which the one or more instructions are inserted at a dispatch stage of the processor pipeline.

19. The method of claim 15, in which one of the one or more instructions is configured to cause a cache miss or a tablewalk without checking an address.

20. An integrated circuit, comprising:
  means for executing instructions in a processor pipeline using an architectural state of a processor core;
  means for storing a thread identifier; and
  means for generating a random parameter;
  where executing the instructions comprises:
  determining a time for insertion based on the random parameter;
  at the time for insertion, inserting one or more instructions in the processor pipeline by participating in thread arbitration using the thread identifier; and
  executing the one or more instructions using one or more execution units of the processor pipeline.

* * * * *